United States Patent
Bengtsson et al.

(10) Patent No.: US 11,121,748 B2
(45) Date of Patent: Sep. 14, 2021

(54) SYNCHRONIZING DEVICES IN A WIRELESS COMMUNICATION NETWORK

(71) Applicant: Sony Mobile Communications Inc., Tokyo (JP)

(72) Inventors: Erik Bengtsson, Eslöv (SE); Basuki Priyanto, Lund (SE); Olof Zander, Södra Sandby (SE)

(73) Assignee: SONY GROUP CORPORATION, Tokyo (JP)

( * ) Notice: Subject to any disclaimer, the term of this patent is extended or adjusted under 35 U.S.C. 154(b) by 4 days.

(21) Appl. No.: 16/346,480

(22) PCT Filed: Nov. 3, 2017

(86) PCT No.: PCT/EP2017/078123
§ 371 (c)(1),
(2) Date: Apr. 30, 2019

(87) PCT Pub. No.: WO2018/083208
PCT Pub. Date: May 11, 2018

(65) Prior Publication Data
US 2019/0280743 A1    Sep. 12, 2019

(30) Foreign Application Priority Data
Nov. 4, 2016    (EP) .................................... 16197353

(51) Int. Cl.
*H04B 7/0456*    (2017.01)
*H04B 7/06*    (2006.01)
(Continued)

(52) U.S. Cl.
CPC ......... *H04B 7/0456* (2013.01); *H04B 7/0617* (2013.01); *H04L 5/0051* (2013.01);
(Continued)

(58) Field of Classification Search
CPC ... H04B 7/0456; H04B 7/0617; H04L 5/0051; H04L 27/2602; H04L 5/0044;
(Continued)

(56) References Cited

U.S. PATENT DOCUMENTS

2015/0131750 A1    5/2015    Xue
2015/0207549 A1*   7/2015    Nagata .............. H04W 72/0453
                                                        370/252
(Continued)

FOREIGN PATENT DOCUMENTS

EP    2124362    11/2009

OTHER PUBLICATIONS

PCT Written Opinion, dated Dec. 20, 2017, for corresponding PCT International Application No. PCT/EP2017/078123 (8 pages).
(Continued)

*Primary Examiner* — Hardikkumar D Patel
(74) *Attorney, Agent, or Firm* — Myers Bigel, P.A

(57) ABSTRACT

The present disclosure relates to a method for operating a base station of a wireless communication network. Precoding information for concentrating a radio-frequency power of a transmitted radio-frequency signal to a group of terminal devices arranged in a sub area of a coverage area of the base station is determined and applied to an antenna array of the base station. A synchronization signal is transmitted from the base station to the group of terminal devices using the precoding information.

13 Claims, 3 Drawing Sheets

(51) Int. Cl.
  *H04L 5/00* (2006.01)
  *H04W 56/00* (2009.01)
  *H04W 72/04* (2009.01)
  *H04W 72/12* (2009.01)
(52) U.S. Cl.
  CPC ..... *H04W 56/001* (2013.01); *H04W 56/0005* (2013.01); *H04W 72/0473* (2013.01); *H04W 72/1257* (2013.01)
(58) Field of Classification Search
  CPC ........... H04W 56/0005; H04W 56/001; H04W 72/1257; H04W 72/0473; H04W 56/0025; H04W 48/14; H01Q 1/246
  See application file for complete search history.

(56) References Cited

U.S. PATENT DOCUMENTS

2015/0327204 A1* 11/2015 Park .................. H04W 56/0015
                                          370/350
2016/0183205 A1   6/2016 Li

OTHER PUBLICATIONS

PCT International Search Report, dated Dec. 20, 2017, for corresponding PCT International Application No. PCT/EP2017/078123 (5 pages).

* cited by examiner

SYNCHRONIZING DEVICES IN A WIRELESS COMMUNICATION NETWORK

CROSS REFERENCE TO RELATED APPLICATION

This application is a 35 U.S.C. § 371 national stage application of PCT International Application No. PCT/EP2017/078123, filed on Nov. 3, 2017, which claims priority from European Application No. EP 16 197 353.2 filed on Nov. 4, 2016 the contents of which are incorporated herein by reference in their entireties. The above-referenced PCT International Application was published in the English language as International Publication No. WO 2018/083208 A1 on May 11, 2018.

FIELD OF THE INVENTION

The present invention relates to a method for operating a base station of a wireless communication network, in particular for synchronizing terminal devices of the wireless communication network.

BACKGROUND OF THE INVENTION

An increasing amount of devices may take advantage of communication in a wireless communication network. For example, terminal devices referred to as Internet of Things (IoT) device or terminal devices using a communication among each other, a so-called Machine Type Communication (MTC), may utilize communication via a wireless communication network.

Multiple-input and multiple-output systems, so-called MIMO systems, and in particular so-called massive MIMO systems, may improve spectral efficiency as well as energy efficiency by the use of channel estimation for both uplink communication from a terminal device to a base station and downlink communication from the base station to the terminal device. MIMO systems may use multiple send and receive antennas for wireless communication at the base station as well as the terminal devices. In particular, in massive MIMO systems, the base station may include a large number of antennas, for example several tens or even in excess of one hundred antennas with associated transceiver circuitry. The extra antennas of the massive MIMO base station allow radio energy to be spatially focused in transmissions as well as a directional sensitive reception. In order to adapt and receive signals at each individual antenna of the base station in accordance with the currently active terminal devices, the base station logic needs information about wireless radio channel properties between the terminal device and the antennas of the base station. A pilot signaling scheme, a so-called channel sounding, may be utilized for this purpose. The channel sounding allows the base station to set configuration antenna parameters for transmitting signals so as to focus radio energy at the terminal device and for receiving signals from the terminal devices. Training sequences, so-called pilot signals, may be transmitted from the terminal device in a resource which is dedicated to the terminal device.

The massive MIMO approach may be utilized in particular in connection with IOT devices or MTC as the antenna gain is large and thus the power consumption for transmitting data of the terminal devices may be reduced. Furthermore, many IOT devices, for example smart meters, are stationary devices which may not be moved during their entire lifetime. Thus, the channel properties between an IOT device and the base station may not varying rapidly.

However, for setting up a wireless link between an base station and a terminal device, a temporal synchronization between the base station and the terminal device may be needed and maintained. In particular, a temporal synchronization may already be needed for transmitting pilot signals for estimating the radio channel properties in MIMO systems. Corresponding synchronization signals or messages may be defined in the wireless communication network. Nevertheless, an initialization of the wireless link between the MIMO base station and the terminal device, including for example a transmission of a synchronization signal and pilot signals, may not benefit from the enhanced antenna gain. In particular, synchronization and pilot signal transmission of terminal devices arranged in areas having poor receiving conditions may raise problems.

SUMMARY OF THE INVENTION

Therefore, a need exists for advanced techniques for synchronizing base stations and terminal devices communicating via a wireless link. In particular, there is a need for techniques of synchronizing base stations and terminal devices communicating on a wireless link which overcomes or mitigates at least some of the above identified restrictions and drawbacks.

This need is met by the features of the independent claims. The features of the dependent claims define embodiments.

According to an embodiment, a method for operating a base station of a wireless communication network is provided. The base station comprises an antenna array comprising a plurality of antennas configured to communicate wirelessly with terminal devices positioned within a coverage area of the base station. A spatial transmission characteristic of the antenna array is configurable by applying precoding information. For example, to each antenna of the plurality of antennas of the antenna array a corresponding transceiver is assigned. The precoding information is applied to the antenna array by applying to each transceiver corresponding gain information provided by the precoding information. Additionally or as an alternative, to each transceiver a corresponding phase information provided by the precoding information is applied.

According to the method, precoding information is determined which is configured to concentrate a radio-frequency power of the transmitted radio-frequency signals to a group of terminal devices which is arranged in a sub area of the coverage area of the base station. The group of terminal devices may comprise at least one terminal device or a plurality of terminal devices. The sub area may comprise a sector of the coverage area of the base station or a contiguous or noncontiguous area of any shape, which may result from applying the precoding information. However, the area of the sub area may be narrower or smaller than the coverage area of the base station. Therefore, when a certain transmission power is emitted from the plurality of antennas using the precoding information, the radio-frequency power received within the sub area is larger than the radio-frequency power received within the sub area when the same certain transmission power is transmitted from the plurality of antennas without using the precoding information.

Furthermore, according to the method, the determined precoding information is applied to the antenna array and a synchronization signal is transmitted from the base station to the group of terminal devices using the precoding information.

The synchronization signal may comprise a sequence of synchronization signals which may be averaged by each of the terminal devices to reduce disturbances on the synchronization signal and to acquire synchronization to the base station.

In other words, a synchronization distribution in a sub area is performed. This distribution is based on a beamforming of a synchronization signal into a sub area. Such a beamforming of corresponding synchronization signals into further sub areas may be consecutively performed to cover all areas of the coverage area of the base station or to cover at least all those areas where terminal devices to be synchronized are arranged. Due to the beamforming a power of the synchronization signal for the terminal devices located within the sub area may be enhanced. Under critical reception conditions, a terminal device may average several synchronization signals to synchronize to the base station. With the enhanced power of the synchronization signal the terminal device does not need to average as much and may save some energy and thus minimize energy consumption. Furthermore, the synchronization signal distributed by the beamforming may be received by a plurality of terminal devices arranged within the sub area. Therefore, synchronization of a plurality of terminal devices may be initiated and maintained with reasonable effort.

According to an embodiment, the precoding information is determined based on the corresponding position information of each terminal device of the group of terminal devices. For example, position information of the terminal devices may be provided by an application layer of the wireless communication network where this information is determined based on previous communication with the terminal devices. The position information may comprise or may be derived from a geographical position of the terminal device. Based on the position information, a grouping of the terminal devices may be conducted and precoding information may be determined such that a corresponding sub area covers the group of terminal devices. The position information may comprise a velocity of the terminal device and/or moving direction of the terminal device. Based on the velocity and/or moving direction the base station may determine that a terminal device may not be synchronized by a beam-formed synchronization signal, as it is not stationary or moving too fast or will be moving out of the beam.

Additionally or as an alternative, the precoding information may be based on corresponding previous precoding information, which has been used during previous communications between the base station and each terminal device of the group of terminal devices. In particular for static terminal devices, which are stationary or which do not move significantly, a once determined precoding information for distributing a synchronization signal may be reused for maintaining synchronization.

Additionally or as an alternative, the precoding information may be selected from a predefined set of precoding information based on a pilot signal received from a terminal device. For example, a plurality of sub areas may be defined and to each sub area a corresponding precoding information from the predefined set of precoding information is assigned. A pilot signal may be received from a terminal device and based on the pilot signal the base station may associate the terminal device with a corresponding one of the plurality of sub areas. The sending terminal device is assigned to the group of terminal devices assigned to the sub area and corresponding precoding information. For synchronizing the terminal device, the corresponding precoding information is selected and applied to the antenna array for beamforming the synchronization signal to the terminal device.

Furthermore, additionally or as an alternative, a predefined set of precoding information may be provided and each precoding information of the set may be assigned to a certain sub area such that by the whole set of precoding information the whole coverage area of the base station is covered. Each precoding information of the set of precoding information may be selected and applied to the antenna array according to a predefined scheme and synchronization signals may be transmitted from the base station to the group of terminal devices using the currently selected precoding scheme. Each terminal device may listen to the emitted synchronization signals and may select the most appropriate synchronization signal for synchronizing to the base station. The synchronization signals may be distributed into the sub areas and may be associated with a resource block or identifier (ID). Each terminal device may receive one or more of these precoded synchronization signals and may report to the base station which synchronization signal has the strongest level in the sub area in which the corresponding terminal device resides.

According to another embodiment, a time interval information is received from at least one terminal device of the group of terminal devices. The time interval information indicates a required maximum time interval for synchronizing the at least one terminal device. A schedule information indicating a schedule for transmitting the synchronization signal using the precoding information is determined by the base station. The schedule information may be determined based on the received time interval information such that the at least one terminal device is synchronized within the required maximum time interval. Furthermore, time interval information may be received from a plurality or all of the terminal devices of the group of terminal devices and the schedule information may be determined based on the time interval information received from these terminal devices to guarantee that each terminal device of the group of terminal devices is synchronized within the required time interval.

The determined schedule information may be transmitted from the base station to the group of terminal devices. The terminal devices of the group of terminal devices may use the schedule information received from the base station to wake up at corresponding points in time to receive the synchronization signal for maintaining synchronization to the base station.

Transmitting the time interval information from a terminal device to the base station may include that the terminal device requests a scheduling scheme from the base station. The scheduling scheme may comprise a set of predetermined synchronization intervals or rates and the terminal device selects one of the intervals or rates, which is then used by the base station for synchronizing the group of terminal devices.

According to another embodiment, timing and/or frequency information of the base station is acquired at a terminal device of the group of terminal devices based on the synchronization signal transmitted from the base station. A pilot signal is transmitted from the terminal device to the base station based on the acquired timing and/or frequency information. The pilot signal is configured for a channel sounding of a radio frequency channel between the terminal device and the base station. Based on the channel sounding, the base station may determine characteristics of the radio-frequency channel. In other words, the terminal device may be synchronized to the base station and an uplink pilot signal from the terminal device to the base station may be transmitted at a predefined timeslot and frequency without disturbing other communications within a radio-frequency cell supported by the base station. Based on the received pilot signal, the base station may communicate with the terminal device according to MIMO or massive MIMO technologies.

In particular, the pilot signal from the terminal device may be received at the base station and the base station may determine further precoding information based on the pilot signal received from the terminal device. The further precoding information may be applied to the antenna array, and a synchronization signal may be transmitted from the base station to the terminal device using the further precoding information. Additionally, payload data may be transmitted from the base station to the terminal device using the further precoding information. Thus, synchronization signals and payload data may be transmitted from the base station to the terminal device according to MIMO or massive MIMO technologies. This enables the synchronization signal to be transmitted with the full MIMO gain such that a power consumption in the terminal device for receiving and averaging synchronization signals may be reduced.

According to a further embodiment, time interval information is received from the terminal device. The time interval information indicates a required maximum time interval for synchronizing the terminal device. Further schedule information indicating a schedule for transmitting the synchronization signal using the further precoding information is determined. As the further precoding information enables to focus a transmission to an individual terminal device, a time interval for updating synchronization of the individual terminal device may be scheduled individually for each terminal device.

The further schedule information may be transmitted from the base station to the terminal device.

According to the present invention, a base station is provided comprising an antenna array and a control unit. The antenna array has a plurality of antennas configured to communicate wirelessly with terminal devices positioned with in a coverage area of the base station. A spatial transmission characteristic of the antenna array this configurable by applying precoding information. The control unit is configured to determine precoding information for concentrating a radio-frequency power of transmitted radio-frequency signals to a group of terminal devices arranged in a sub area of the coverage area of the base station. Furthermore, the control unit is configured to apply the determined precoding information to the antenna array and to transmit a synchronization signal using the precoding information. For example, to each antenna of the plurality of antennas of the antenna array a corresponding transceiver is assigned. The precoding information may be applied to the antenna array by applying to each transceiver corresponding gain information provided by the precoding information or by applying corresponding phase information provided by the precoding information. By applying the precoding information, radio-frequency signals transmitted from the antenna array may be beam-formed to increase the received radio frequency power in the corresponding sub area. The synchronization signal may comprise a sequence of same synchronization signals, which may be averaged by of the terminal devices to reduce disturbances on the synchronization signal. For example, the synchronization signal may comprise a sequence of several tens or some hundred same synchronization signals.

Determining the precoding information may comprise for example to determine the precoding information based on corresponding position information of each terminal device of the group of terminal devices. The position information of each of the terminal devices may be provided by an application layer of the wireless communication network. The position information may comprise for example a geographical position of the terminal device, the velocity and/or moving direction of the terminal device. Furthermore, the precoding information may be determined based on corresponding previous precoding information, which has been used during previous communications between the base station each terminal device of the group of terminal devices. Additionally or as an alternative, the precoding information may be selected from a predefined set of precoding information based on a pilot signal received from a terminal device. A plurality of sub areas may be defined and a corresponding precoding information may be assigned to each sub area. When a pilot signal is received from a terminal device, based on the pilot signal the base station may associate the terminal device to a corresponding one of the plurality of sub areas. The precoding information assigned to the sub area assigned to the terminal device is selected and applied to the antenna array for transmitting the synchronization signal to the terminal device.

According to an embodiment, the base station may receive a time interval information from at least one terminal device of the group of terminal devices. The time interval information indicates a required maximum time interval for synchronizing the at least one terminal device. A schedule information indicating a schedule for transmitting the synchronization signal using the precoding information is determined by the control unit of the base station based on the received time interval information. The determined schedule information may be transmitted from the base station to the group of terminal devices.

According to a further embodiment, the base station may receive a pilot signal transmitted from the terminal device. The pilot signal may be transmitted by the terminal device based on timing and/or frequency information acquired at the terminal device from the synchronization signal. The pilot signal may be configured for performing a channel sounding of a radio frequency channel between the terminal device and the base station. Based on the channel sounding, the base station may determine characteristics of the radio-frequency channel. Based on the determined radio characteristics, the base station may determine precoding information for transmitting radio-frequency signals to the terminal device according to MIMO or massive MIMO technologies. In particular, the base station may apply the determined precoding information and may transmit synchronization signals using the precoding information. Thus, a signal power of the synchronization signal received at the terminal device may be further increased.

According to another embodiment, the base station receives a time interval information from the terminal device. The time interval information indicates a required maximum time interval for synchronizing the terminal device. Based on the received time interval information, the control unit of the base station determines further schedule information indicating a schedule for transmitting the synchronization signal using the further precoding information to the terminal device.

The further schedule information is transmitted from the base station to the terminal device to enable the terminal device to wake up or activate its receiver for receiving synchronization signals.

Furthermore, according to the present invention, a terminal device comprising at least one antenna and a synchronization control unit is provided. The at least one antenna is configured to wirelessly communicate with a base station of a wireless communication network. The synchronization control unit is configured to receive a sequence of synchronization signals from the base station, and to acquire timing and/or frequency information of the base station based on the synchronization signals. For example, upon synchronization is required, the synchronization control unit may transmit time interval information to the base station which indicates a required maximum time interval for synchronizing the terminal device.

Furthermore, the synchronization control unit may receive schedule information from the base station indicating for example timing information when the base station will transmit synchronization signals, which may be used by the terminal device to update and maintain its synchronization to the base station. The synchronization control unit may automatically change from an inactive state into an active state based on the received schedule information. Thus, the terminal device may reduce the power required for maintaining and updating synchronization.

According to the present invention, a system is provided which comprises the above-described terminal device and the above-described base station. The terminal device and the base station may be configured to perform the above-described method or anyone of the embodiments described above and comprises therefore also the above-described advantages.

Although specific features described in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

The present invention will be described in more detail with reference to the accompanying drawings.

DETAILED DESCRIPTION OF EMBODIMENTS

In the following, exemplary embodiments of the present invention will be described in more detail. It is to be understood that the features of the various exemplary embodiments described herein may be combined with each other unless specifically noted otherwise. Same reference signs in the various drawings refer to similar or identical components. Any coupling between components or devices shown in the figures may be a direct or indirect coupling unless specifically noted otherwise.

Figure 1:
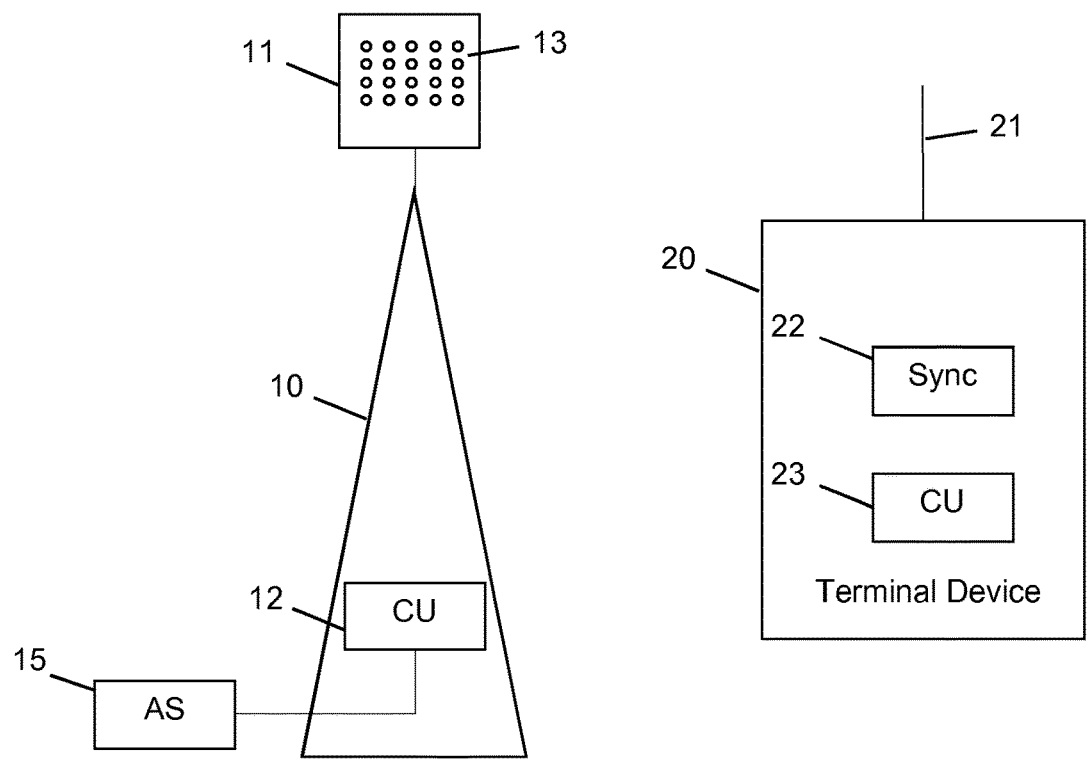
FIG. 1 shows schematically a base station and a terminal device according to embodiments of the present invention.

FIG. 1 shows schematically a wireless cellular multiple-input and multiple-output (MIMO) communication system comprising a base station 10 and a terminal device 20. The base station 10 comprises an antenna array 11 including a plurality of antennas 13. The base station 10 may have a large number of antennas 13, such as several tens or in excess of one hundred antennas. The antennas 13 may be arranged in a two- or three-dimensional spatial array on a carrier. The plurality of antennas may also be spatially distributed to various locations, for example in a cooperative MIMO system. Furthermore, it is possible that several base stations interact in a cooperative manner with the plurality of antennas being distributed over various locations. The communication system may be a 3GPP-specified network such as 3G, 4G or upcoming 5G.

The base station 10 comprises a control unit (CU) 12 controlling communication with the terminal device 20 via the antenna array 11. The control unit 12 may be coupled to an application server (AS) 15, which may provide additional information about the terminal device 20, for example a position information of the terminal device 20, an identifier of the terminal device 20 and a type of the terminal device 20, for example if the terminal device 20 is a stationary device or a movable device, an IOT (Internet of things) device or a device using and supporting machine type communication (MTC). The application server 15 may be a separate device located apart from the base station 10 and coupled to the base station 10 via a corresponding communication link, or the application server 15 may be integrated in the base station 10. For example, the application server can be a Mobile Edge Computing (MEC) server.

The base station 10, in particular the control unit 12 of the base station 10, may be configured to transmit synchronization signals to terminal devices arranged within a coverage area of the base station 10 to synchronize the terminal devices to the base station 10.

The plurality of antennas 13 of the antenna array 11 enables the base station 10 to form a shape of a beam of a transmitted radio-frequency signal. This technique, which is also called beamforming, increases the field strength in some areas, whereas the field strength in some other areas is lowered. The beamforming may be controlled by configuring an amplitude and phase of the transmitted radio-frequency signal for each antenna 13 of the antenna array 11. By controlling the amplitude and phase a direction and shape may be configured. Configuring the amplitude and phase of the antenna array 11 is also called precoding and therefore a radio frequency signal transmitted with certain amplitude and phase configuration of the antenna array 11 is called a precoded radio frequency signal.

Figure 2:
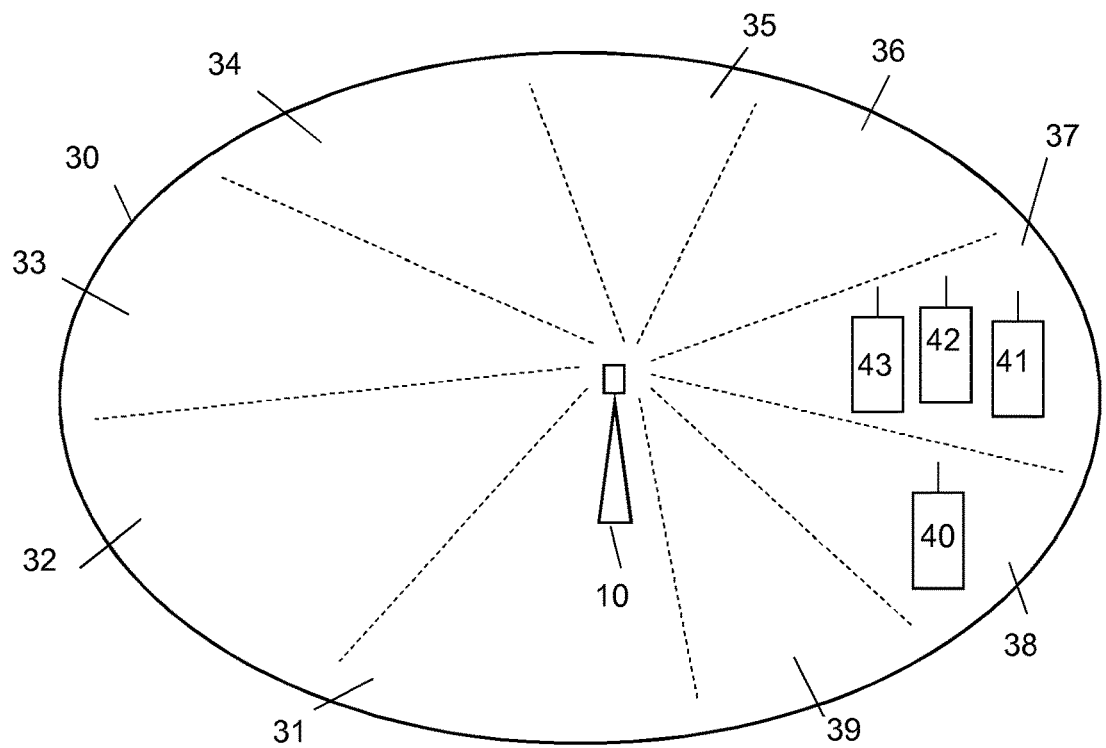
FIG. 2 shows schematically a system comprising a base station and a plurality of terminal devices according to embodiments of the present invention.

In other words, the beamforming enables to concentrate the available transmission power into a certain sub area of the coverage area of the base station 10. This increases a field strength in this sub area, whereas the field strengths in the remaining sub areas is lowered. For example, the coverage area of the base station may be divided into a plurality of sub areas in the form of sectors and for each sector a corresponding precoding may be provided to increase the field strength within this sector significantly when being applied. FIG. 2 shows a coverage area 30 of the base station 10 divided into nine sectors 31 to 39. Terminal devices 41 to 43 may be arranged in sector 37 and a terminal device 44 may be arranged in sector 38.

Figure 3:
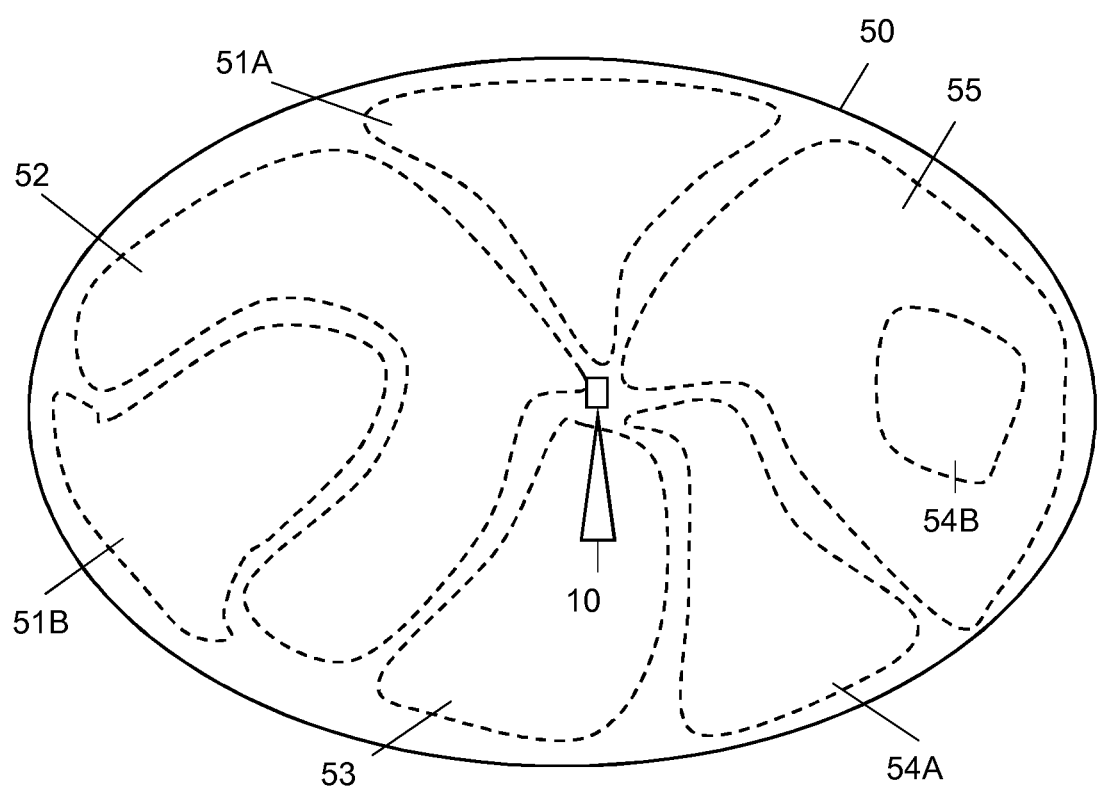
FIG. 3 shows schematically a system according to embodiments of the present invention.

However, due to shadowing and reflections, the sub areas may have a more complex shape than the sectors shown in FIG. 2 and may additionally be noncontiguous. FIG. 3 shows an example of sub areas having a more complex shape. A coverage area 50 of the base station 10 is divided into five sub areas 51 to 55 with the areas 51 and 54 being noncontiguous. Therefore, in FIG. 3, sub area 51 is indicated by reference signs 51A and 51B, and sub area 54 is indicated by reference signs 54A and 54B.

The following methods for distributing synchronization signals in a coverage area of a base station will be described in connection with the sectors shown in FIG. 2 for clarity reasons. However, the principles may be applied likewise to sub areas having a more complex shape as the sub areas shown in FIG. 3.

The base station 10 is furthermore configured to analyze a pilot signal received from a terminal device at the plurality of antennas 13 of the base station 10 to determine channel characteristics for a radio signal transmission between the plurality of antennas 13 of the base station 10 and the terminal device 20. For illustration, the control unit 12 of the base station 10 may be configured to determine a footprint matrix based on a pilot signal received by the plurality of antennas 13 from a terminal device 20. The control unit 12 may use the footprint matrix to control the plurality of antennas 13 when transmitting radio frequency signals to the terminal device 20. The control unit 12 may compute a Hermitian conjugate of the footprint matrix to determine time delays and amplitudes of radio frequency signals transmitted by each of the plurality of antennas 13 to focus a radio energy in a sector in which the terminal device 20 is located. For example, the control unit 12 may control a transmission of signals via the plurality of antennas 13 based on radio channel properties, for example based on a footprint matrix, obtained for a pilot signal transmission from a terminal device 20 to control a transmission of signals by the plurality of antennas 13 to transmit a downlink (DL) signal carrying control signaling or payload data to a spatial sector in which the terminal device 20 is located. The control may be performed in such a way that focusing of radio energy is not only performed as a function of direction, but also as a function of distance from the base station 10. For example, for several terminal devices located in the same direction and at similar distance from the base station, the base station 10 may control the transmission of signals trough the plurality of antennas 13 in such a way that the radio energy is focused in the direction in which the terminals are located and at the distance at which the terminals are located.

The terminal device 20 comprises at least one antenna 21, a synchronization control unit 22 and a control unit 23. The terminal device 20 may be for example a mobile telephone, in particular a so-called smart phone, or an Internet of things device. The control unit 23 controls operation of the terminal device, for example, the control unit 23 may execute applications provided in a memory of the terminal device 20. The terminal device 20 may comprise further components, for example a user interface or sensors, a power supply, for example a battery, and a transceiver coupled to the antenna 21. However, these additional components are not shown in FIG. 1 for clarity reasons. The terminal device 20 may be configured to communicate via a wireless communication with the base station 10. For example, the terminal device 20 may communicate voice data or sensor data with the base station 10. For operating the terminal device 20 in connection with the base station 10 in for example a cellular wireless communication network, the terminal device 20 may have to be synchronized to a timing of the base station 10, for example for receiving downlink (DL) data from the base station 10 and transmitting uplink (UL) data to the base station 10. Synchronizing the terminal device 20 to the base station 10 may comprise adapting an internal timing of the terminal device 20 in frequency and phase to a timing of the base station 10.

In the following, examples for enabling a synchronization between a base station and terminal devices communicating on a wireless link are provided. A synchronization between the base station and terminal devices enables to provide a common time reference and/or a common frequency reference to the base station and the terminal devices communicating on the wireless link. Based on such a common time reference and/or frequency reference, it is possible to implement a time-frequency resource mapping to synchronize communication of uplink signals and/or downlink signals between the base station and terminal devices communicating on the wireless link.

For example, a sequence of downlink synchronization signals may be transmitted from the base station 10 to the terminal device 20. The sequence of synchronization signals may comprise multiple repetitions of synchronization signals and may have a well defined duration. The sequence may use adjacent transmission frames of the wireless link for transmission of the downlink synchronization signals. The sequence may use adjacent resources for transmission of downlink synchronization signals. In the terminal device 20, the received downlink synchronization signals of the sequence may be averaged to increase a signal-to-noise ratio. This may enhance coverage of the base station 10. For example, averaging may correspond to summation of the power or magnitude of the received downlink synchronization signals.

In wireless communication networks, synchronization accuracy may deteriorate for example due to a movement of a terminal device with respect to a base station, changes in the environment or due to a drifting of a timing circuit of the terminal device. In particular, Internet of things devices may be stationary such that synchronization accuracy is essentially influenced by the timing circuit drift and/or physical changes of the environment. Therefore, in stationary terminal devices an evaluation of synchronization signals from the base station may only be needed in certain time intervals to maintain synchronization to the base station. The time intervals may be in the range of several seconds or minutes up to several hours or even days. On the other hand, a stationary terminal device may have very restricted energy resources. For example, a power meter, which is remotely controllable and provides sensor data via a wireless communication link, may be required to be powered by a battery for several years. Consequently, receiving a sequence of synchronization signals and averaging the synchronization signals may consume a considerable amount of electrical energy in view of the available electrical energy from the battery. Therefore, the following method described in connection with FIG. 4 may contribute to reduce the power consumption for synchronizing a terminal device to a base station.

Figure 4:
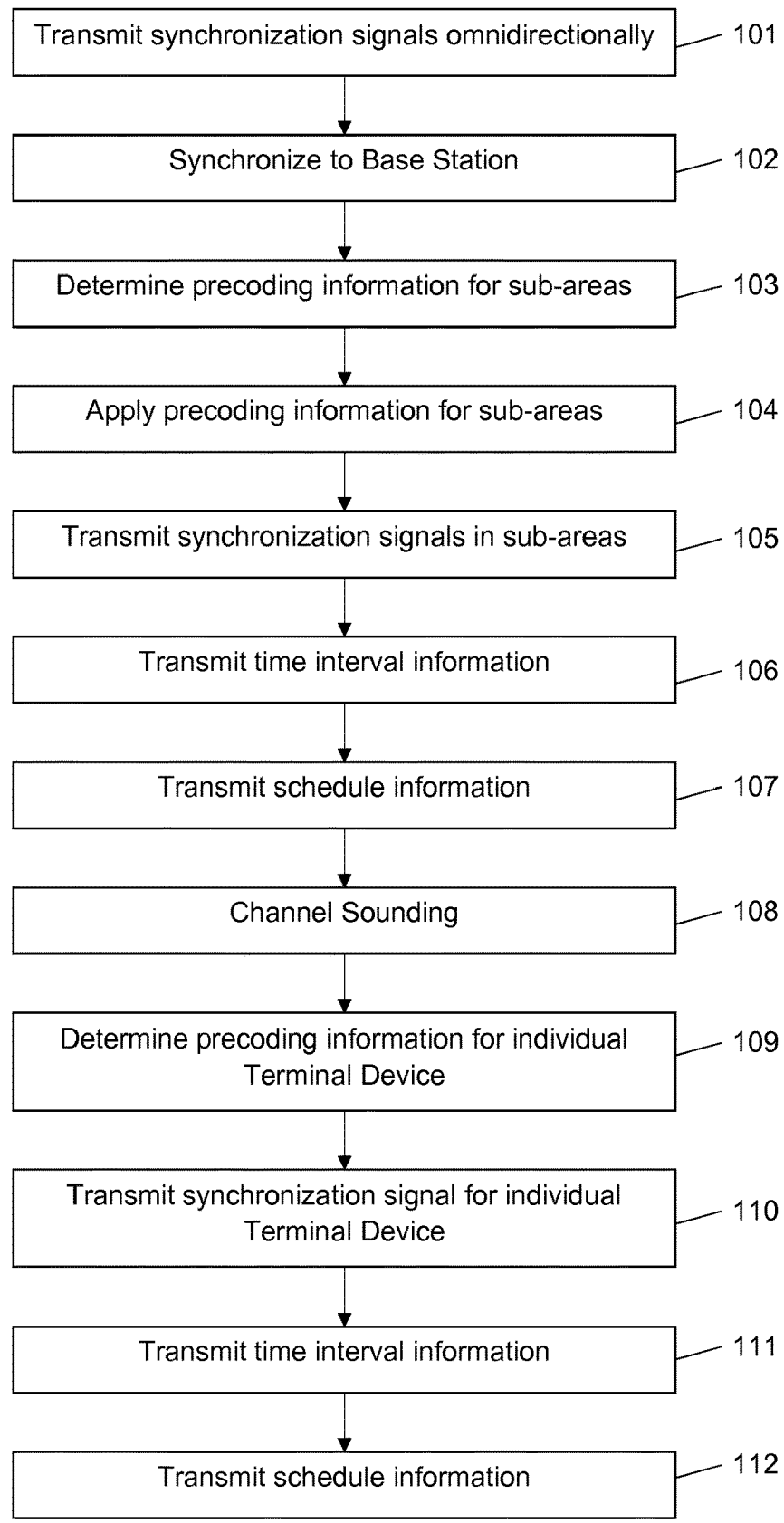
FIG. 4 shows schematically method steps of a method according to embodiments of the present invention.

The method described in FIG. 4 comprises a plurality of method steps 101 to 112 which will be described in the following in connection with FIG. 2. In step 101 the base station 10 may transmit omnidirectional synchronization signals. For example, the synchronization signals may be transmitted without any precoding such that the synchronization signals may be received within the whole coverage area 30. In particular mobile terminal devices and newly established terminal devices may receive these omnidirectional synchronization signals and may synchronize to the base station based on the received synchronization signals in step 102. Terminal devices at the periphery of the coverage area 30 may need to average the synchronization signals over a long time to synchronize and this may have an impact on the power consumption needed for synchronization.

In particular, stationary devices may indicate they are position or how to be reached more efficiently to the base station, for example via the application server 15. Based on this information the base station 10 may determine precoding information for concentrating a transmission of synchronization signals into sub areas in step 103. For example, terminal devices 41 to 43 may transmit their geographical positions to the base station 10 and the base station 10 may determine a corresponding precoding information concentrating a radio-frequency power of a synchronization signal into sub area or sector 37. In step 104 the base station applies the determined precoding information for the sub area to the antenna array 11 and transmits synchronization signals concentrated into the sub area in step 105. For example, a certain frequency and/or time resource may be used for transmitting a precoded synchronization signal into sector 37.

In another example, the base station may provide a plurality of precoding information, which cover as a whole essentially the whole coverage area of the base station. Thus, synchronization signals may be distributed into all sectors and may be associated with a resource block or identifier (ID). Each terminal device may receive one or more of these precoded synchronization signals and may report to the base station which synchronization signal has the strongest level in the sector in which the corresponding terminal device resides.

Additionally or as an alternative, terminal devices 41-43 may transmit each a pilot signal to the base station 10, and the base station 10 may determine from the pilot signals corresponding precoding matrixes. Based on the precoding matrixes, the base station 10 may determine a precoding information which defines a sub area which covers all of the terminal devices 41 to 43. For example, a specific precoding information may be calculated based on the precoding matrixes. As an alternative, a set of predefined precoding information may be provided and the terminal devices may be assigned to a corresponding one of the corresponding precoding information based on a matching of the precoding matrix to the precoding information. The transmission of the synchronization signals by beamforming the synchronization signals to the certain sector or sub area, results in an enhanced synchronization signal for terminal devices located within this sub area. For example, a terminal device within this sub area does not need to average as much and can save therefore energy for synchronization and thus minimize energy consumption.

Furthermore, a scheduling of distribution of synchronization signals may be established. For example, a terminal device may communicate to the base station a time interval, which is not to be exceeded before a next synchronization has to be performed to maintain the terminal device within a required synchronization accuracy to the base station (step 106). Based on the time interval from the terminal device or based on several time intervals received from several terminal devices within the same sub area, the base station may determine a time schedule for transmitting precoded synchronization signals focused into the sub area. The time schedule may be transmitted to the terminal devices within the sub area in step 107.

As an alternative, the base station may provide a plurality of frequency and/or time resources for transmitting synchronization signals and a corresponding time schedules indicating when synchronization signals will be provided in the corresponding resources. A terminal device arranged in the sub area may select an appropriate resource for maintaining synchronization to the base station. Based on the time schedule the terminal devices may wake up the synchronization control unit 22 only when a synchronization update to the base station is required and the synchronization signals are provided by the base station. A wake-up a rate may be in a range of minutes, hours or even once a day.

For further enhancing the synchronization of a terminal device to the base station 10, a channel sounding of a radio-frequency channel between the base station 10 and a terminal device may be performed in step 108. For example, the terminal device, for example terminal device 44 in FIG. 2, may transmit a pilot signal to the base station 10. The base station 10 may receive the pilot signal from the terminal device 44 and determine, based on the pilot signal, precoding information which focuses a radio frequency signal individually to the terminal device 44 in step 109. The precoding information may be applied to the antenna array 11 of the base station 10 and a synchronization signal focused on the individual terminal device 44 may be transmitted using the precoding information in step 110.

The base station and the terminal device 44 may negotiate a time interval for the transmission of synchronization signals precoded individually for the terminal device 44 in steps 111 and 112. For example, the terminal device 44 may transmit a time interval information to the base station, which indicates a required maximum time interval for synchronizing the terminal device 44 (step 111). The base station 10 receives the time interval information and determines a corresponding schedule information for transmitting the synchronization signal at certain frequencies/time resources using the precoding information, which directs the synchronization signal specifically to the terminal device 44. The schedule information is transmitted in step 112 to the terminal device 44, and the terminal device 44 automatically changes from an inactivity state into an active state based on the received schedule information to receive the synchronization signal at the certain frequency/time resources. In other words, the synchronization signal is precoded according to (massive) MIMO technologies and a corresponding (massive) MIMO gain may be gained for the transmission of the synchronization signal. This may be in particular interesting for low-cost terminal devices where the internal timing may have a low performance and averaging over a long period of time may be a challenge. Furthermore, due to the shorter averaging, electrical energy for receiving the synchronization signal and synchronizing the internal timing may be reduced.

According to the schedule, the precoded synchronization signals may be transmitted periodically. However, the precoded synchronization signals may be transmitted aperiodically, for example based on requests from the terminal device.

Although the steps 101 to 112 are shown and described above in a subsequent order, these steps may be performed in any other order. In particular, the steps 101 to 112 may be performed in parallel to simultaneously synchronize newly established and mobile terminal devices with omnidirectional synchronization signals (steps 101, 102), and to maintain synchronization of stationary terminal devices, like Internet of things devices, with precoded synchronization signals which are concentrated on certain sub areas (step 105) and which are directed individually to a certain terminal device (step 110). Furthermore, according to an example, for some reasons, for example loss of beam alignment, the terminal device is unable to be synchronized or to process a beam-formed synchronization signal. In this case, the terminal device may need to switch back to "listening" to the omnidirectional synchronization signal provided in step 101.

The invention claimed is:

1. A method for operating a base station of a wireless communication network, the base station comprising an antenna array having a plurality of antennas configured to communicate wirelessly with terminal devices positioned within a coverage area of the base station, a spatial transmission characteristic of the antenna array being configurable by applying precoding information, the method comprising:
  determining the precoding information for concentrating a radio frequency power of a transmitted radio frequency signal to a group of terminal devices arranged in a sub area of the coverage area of the base station,
  applying the determined precoding information to the antenna array,
  transmitting, from the base station to the group of terminal devices, a synchronization signal using the precoding information,
  receiving time interval information from at least one terminal device of the group of terminal devices, the time interval information indicating a required maximum time interval for synchronizing the at least one terminal device, and
  determining schedule information indicating a schedule for transmitting the synchronization signal using the precoding information.

2. The method according to claim 1, wherein determining the precoding information comprises at least one of:
  determining the precoding information based on corresponding position information of each terminal device of the group of terminal devices,
  determining the precoding information based on corresponding previous precoding information, which has been used during previous communications between the base station and each terminal device of the group of terminal devices,
  selecting the precoding information from a predefined set of precoding information based on a pilot signal received from a terminal device, wherein the terminal device is assigned to the group of terminal devices, or
  selecting the precoding information from a predefined set of precoding information based on a report received from a terminal device of the group of terminal device, wherein the report indicates which precoding information provides a synchronization signal having the strongest level in the sub area in which the corresponding terminal device resides.

3. The method according to claim 2, wherein the position information comprises at least one of:
  a geographical position of the terminal device,
  a velocity of the terminal device, or
  a moving direction of the terminal device.

4. The method according to claim 1, further comprising:
  transmitting the schedule information from the base station to the group of terminal devices.

5. The method according to claim 1, further comprising:
  acquiring, at a terminal device of the group of terminal devices, timing and/or frequency information of the base station based on the synchronization signal transmitted from the base station, and
  transmitting a pilot signal from the terminal device to the base station based on the acquired timing and/or frequency information, the pilot signal being configured for a channel sounding of a radio frequency channel between the terminal device and base station for determining characteristics of the radio frequency channel.

6. The method according to claim 5, further comprising:
  receiving the pilot signal from the terminal device at the base station,
  determining further precoding information based on the pilot signal received from the terminal device,
  applying the further precoding information to the antenna array, and
  transmitting, from the base station to the terminal device, the synchronization signal using the further precoding information.

7. The method according to claim 6, further comprising:
  receiving, from the terminal device, time interval information, the time interval information indicating a required maximum time interval for synchronizing the terminal device, and
  determining further schedule information indicating a schedule for transmitting the synchronization signal using the further precoding information.

8. The method according to claim 7, further comprising:
  transmitting the further schedule information from the base station to the terminal device.

9. The method according to claim 1 corresponding transceiver is assigned, wherein applying the precoding information comprises at least one of:
  applying to each transceiver corresponding gain information provided by the precoding information, or
  applying to each transceiver corresponding phase information provided by the precoding information.

10. The method according to claim 1, wherein the synchronization signal comprises a sequence of synchronization signals.

11. A base station, comprising:
  an antenna array having a plurality of antennas configured to communicate wirelessly with terminal devices positioned within a coverage area of the base station, a spatial transmission characteristic of the antenna array being configurable by applying precoding information, and
  a control unit configured
    to determine precoding information for concentrating a radio frequency power of a transmitted radio frequency signal to a group of terminal devices arranged in a sub area of the coverage area of the base station,
    to apply the determined precoding information to the antenna array,
    to transmit a synchronization signal using the precoding information,
    to receive time interval information from at least one terminal device of the group of terminal devices, the time interval information indicating a required maximum time interval for synchronizing the at least one terminal device, and
    to determine schedule information indicating a schedule for transmitting the synchronization signal using the precoding information.

12. A terminal device, comprising
  at least one antenna configured to wirelessly communicate with a base station of a wireless communication network,
  a synchronization control unit configured
    to receive a sequence of synchronization signals from the base station,
    to acquire timing and/or frequency information of the base station based on the synchronization signals, and
    to transmit time interval information to the base station, the time interval information indicating a required maximum time interval for synchronizing the terminal device.

13. The terminal device according to claim 12, wherein the synchronization control unit is configured
to receive schedule information from the base station, and
to automatically change from an inactive state into an active state based on the received schedule information.

* * * * *

UNITED STATES PATENT AND TRADEMARK OFFICE
CERTIFICATE OF CORRECTION

| | | |
|---|---|---|
| PATENT NO. | : 11,121,748 B2 | |
| APPLICATION NO. | : 16/346480 | |
| DATED | : September 14, 2021 | |
| INVENTOR(S) | : Bengtsson et al. | |

It is certified that error appears in the above-identified patent and that said Letters Patent is hereby corrected as shown below:

On the Title Page

(30) Foreign Application Priority Data: Please correct "16197353" to read -- 16197353.2 --

Signed and Sealed this
Fifth Day of July, 2022

Katherine Kelly Vidal
*Director of the United States Patent and Trademark Office*